(12) United States Patent
Pan (10) Patent No.: US 7,800,745 B2
(45) Date of Patent: Sep. 21, 2010

(54) GONIOPHOTOMETER

(75) Inventor: Jian-gen Pan, Hangzhou (CN)

(73) Assignee: Everfine Photo-E-Info Co., Ltd, Hangzhou (CN)

(*) Notice: Subject to any disclaimer, the term of this patent is extended or adjusted under 35 U.S.C. 154(b) by 378 days.

(21) Appl. No.: 12/005,951

(22) Filed: Dec. 27, 2007

(65) Prior Publication Data

US 2008/0304049 A1  Dec. 11, 2008

(30) Foreign Application Priority Data

Jun. 5, 2007  (CN) .................. 2007 1 0069184

(51) Int. Cl.
*G01J 1/00* (2006.01)
(52) U.S. Cl. ...................... 356/121; 356/213
(58) Field of Classification Search ................. 356/121, 356/213
See application file for complete search history.

(56) References Cited

U.S. PATENT DOCUMENTS 5,253,036 A * 10/1993 Ashdown ................ 356/121
5,914,777 A * 6/1999 Imura .................... 356/121
5,949,534 A * 9/1999 Guttman et al. ........... 356/121
2006/0023222 A1* 2/2006 Binder et al. ............. 356/446
2008/0062413 A1* 3/2008 Ashdown et al. .......... 356/218
2009/0185173 A1* 7/2009 Ashdown et al. .......... 356/121

FOREIGN PATENT DOCUMENTS

DE          3802115 A1 *  8/1989

* cited by examiner

*Primary Examiner*—Kara E Geisel
(74) *Attorney, Agent, or Firm*—Hamre, Schumann, Mueller & Larson, P.C.

(57) ABSTRACT

A goniophotometer includes two independent towers: a main support tower and an upright mirror tower. A swing arm is connected to the main support tower and can be rotated around a main horizontal axis. An elliptic flat rotation mirror, a first detector and a second detector are fixed to the swing arm. A test light source that is also connected to the main support tower can be rotated around a vertical axis. An upright round mirror is connected to the upright mirror tower. A far-field measurement can be achieved when a light beam from the test light source travels into the rotation mirror then is reflected to the upright mirror, and then is reflected by the upright mirror to the first detector. A near field measurement is achieved when the second detector receives a test light beam directly form the test light source.

20 Claims, 9 Drawing Sheets

PRIOR ART

FIG. 1

PRIOR ART

GONIOPHOTOMETER

FIELD

This disclosure relates to a goniophotometer for photometry, radiometry, spectroradiometry and/or colorimetry, and particular relates to a goniophotometer that is used to measure luminous intensity distribution and the luminous flux of various kinds of lamps and luminaries.

BACKGROUND

Spatial luminous intensity distribution, which can be accurately measured by goniophotometers, is an important parameter for lamps or luminaries. A photometer head can be rotated around a test light source to measure the luminous intensity of the light source in different spatial angles. The luminous intensity is usually determined by the measurement results of illuminance and the photometric distance law.

Figure 1:
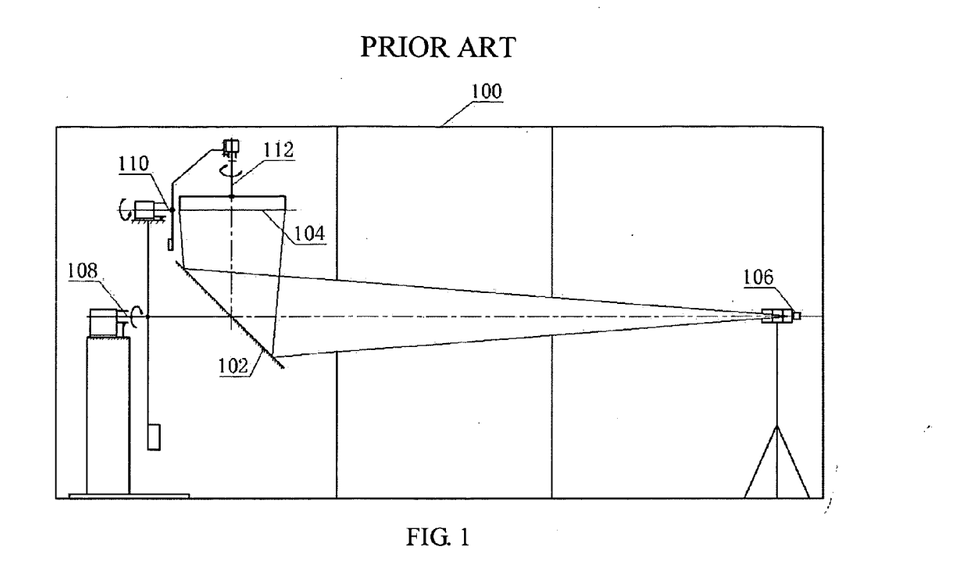
FIG. 1 is a sketch of a centric rotating mirror goniophotometer.
Figure 2:
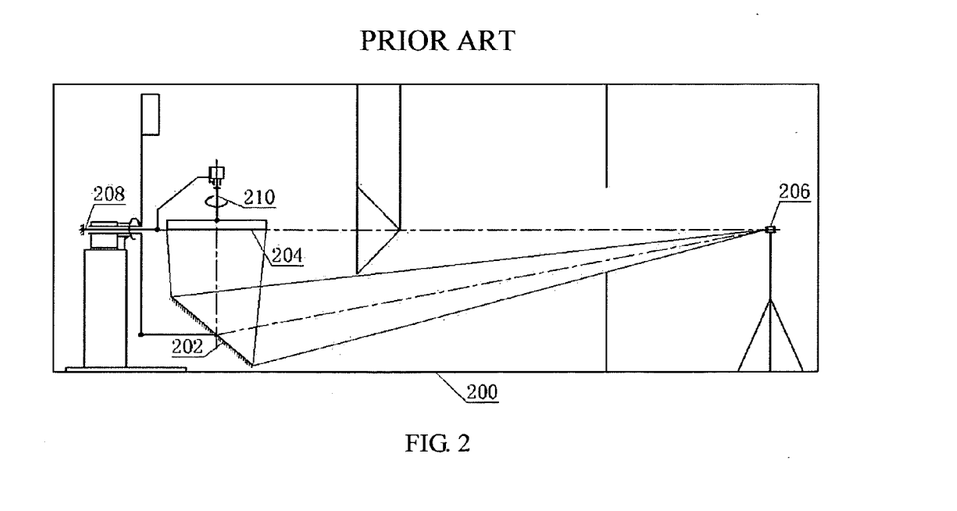
FIG. 2 is a sketch of a circus rotating mirror goniophotometer.

The goniophotometers with mirrors are recommended by the International Commission on Illumination (CIE) and other international standards, because they help measure luminous intensity distribution in a longer measurement distance and also help make a test light source stable. There are generally two kinds of existing goniophotometers with mirrors: 1) centric moving mirror goniophotometer 100 as shown in FIG. 1, wherein a centric moving mirror 102 is at a rotation center, and can be rotated around a main horizontal axis 108 during the measurement. A test light source 104 holding by a lamp support arm can be rotated around the centric mirror 102, and the lamp support arm can be synchronously rotated in the opposite orientation around a horizontal auxiliary axis 110 so as to keep a burning attitude of the test light source 104. The test light source 114 can also be rotated around a vertical axis 112. The centric mirror 102 reflects a light beam from the test light source 104 to a photometer 106. 2) circus moving mirror goniophotometer 200 as shown in FIG. 2, wherein a test light source 204 is at a rotation center. A mirror 202 can be rotated around the test light source 204 and reflects a light beam to a detector 206. There are two rotation axes in the circus moving mirror goniophotometer 200: a main horizontal axis 208 and a vertical axis 210 of the test light source 204.

Although they are relatively accurate in measuring luminous intensity distribution, the above two kinds of goniophotometers have disadvantages. With respect to the centric moving mirror goniophotometer 100, firstly, the test light source 104 needs to move in a large space, thus, it is almost impossible to avoid vibration and shocking of the test light source 104, and consequently the light source 104 can not work very stably because of existence of centripetal force and air flow. Secondly, because of the synchronous rotation between the main axis and the auxiliary axis, it is very difficult for the centric moving mirror goniophotometers to achieve high angle accuracy. In addition, this kind of goniophotometers have a very high darkroom, thus, the total cost is largely increased.

Although the circus moving mirror goniophotometer 200 can overcome the problem of low stability of the test light source as with the centric moving mirror goniophotometer 100, they have following problems. First, the incident angle of a principle light to be measured is strictly limited to no more than 2.5° to a detector by CIE test report No. 70-1987, *The Measurement of Absolute Luminous Intensity Distribution*. This requires a very long measurement distance and thus a very long dark room. Also, it will be very difficult to measure a light with low intensity in such a long distance. Secondly, the circus moving mirror goniophotometer 200 is required to have larger view angles, and, when the detector has a large view angle, it is very difficult to prevent stray light from entering the detector.

In addition, there are few existing goniophotometers that can measure luminance of different points or luminance distribution of the test light source in different spatial angles, despite of the importance of the luminance parameters for inspection and application of the light source. For example, luminance parameters are necessary for evaluation of glare in a lighting design. However, glare parameters are usually calculated by average luminance of the luminaries obtained as the quotient of measured luminous intensity divided by luminous area. In many cases, this is not very accurate. In addition, it cannot show an intuitionistic picture of the test light source in different view angles.

SUMMARY

To avoid the disadvantages mentioned above, this disclosure provides a goniophotometer that can make full use of a darkroom so as to reduce the area of the darkroom, to help keep the test light source highly stable and to help reduce stray light. By selecting different detectors in the goniophotometer, the goniophotometer can conveniently measure in both near field and far field without additional alignment and adjustment. The goniophotometer can intuitionistically observe the luminance and luminance distribution of the test light source in different view angles by an electronic imaging device. With only one of such goniophotometers, multi-photometric parameters of various kinds of lamps or luminaries can be measured.

The disadvantages of the existing goniophotometers can be overcome in the following examples. In one embodiment, a goniophotometer comprises a main support tower and an upright mirror tower. A main horizontal axis is virtually placed. A fixed shaft whose axis is overlapped with the main horizontal axis is placed on the first tower. One end of a lamp support arm is connected to the fixed shaft. The other end of the lamp support arm is connected to a test light source through a rotation driving mechanism, which drives the test light source around a vertical axis that perpendicularly intersects the main horizontal axis. A rotating shaft is rotated around the main horizontal axis in a bearing mounted on the outside surface of the fixed shaft. The rotation shaft is also connected to a bearing support by an outside bearing, and the bearing support is rigidly connected to the main support tower. The outside bearing is between the rotation shaft and the bearing support. One end of the rotation shaft is connected to a driving mechanism; the other end of the rotation shaft is rigidly connected to a swing arm. A rotation mirror and a first detector are connected to the two ends of the swing arm respectively. An upright mirror being perpendicular to the main horizontal axis is rigidly fixed on the upright mirror tower on the opposite side to the main support tower. The test light source can be positioned at the cross point of the main horizontal axis and the vertical axis. A test light beam emitted from the test light source enters the rotation mirror and is then reflected from the rotation mirror to the upright mirror, and is then reflected from the upright mirror to a sensitive surface of the first detector. Both the rotation mirror and the upright mirror are flat. The shape of the rotation mirror is ellipse or round or octagon. The shape of the upright mirror is round or ellipse or octagon as well. It is preferable that the rotating mirror is ellipse, while the upright mirror is round.

The darkroom space is largely decreased by folding a light path via the upright mirror. Further, the synchronous errors and synchronous vibration happened in other goniophotometers with mirrors can be avoided by rigidly connecting the first detector and the rotation mirror to the same swing arm. The mirrors in this system act not only as reflectors in the light path, but also as diaphragms for limiting the size of the light beam so as to reduce stray light. The shape of the mirrors is very important for excluding stray light. In the condition of not causing the vignetting effect, the reflecting area of the mirrors should be as small as possible. In addition, smaller mirrors can help maintain the rigidity of the system and reduce the moment of inertia. This is significant because the rigidity and moment of inertia is crucial for large size and high accuracy goniophotometers.

A second detector can be placed on the swing arm, facing the test light source in normal direction. The second detector has its optical axis perpendicularly intersecting the main horizontal axis and passing through the cross point of the main horizontal axis and the vertical axis. The second detector can achieve a short distance (generally 1 m to 3 m) measurement without using the rotation mirror and the upright mirror. If the second detector is placed on a side closer to the first detector, as oppose to the rotation mirror, the two mirrors should be covered by black velvet when the second detector is in use. However, if the second detector does not face the rotation mirror, it is not necessary to cover the mirrors, and the second detector can work at the same time as the first detector works. The second detector has largely lowered the measurement limit, and is suitable for measuring small or low intensity light sources and luminous flux measurement.

Since the test light source does not move during the measurement, the instable burning state caused by motion can therefore be avoided, and the steadiest working state of the test light source can be achieved. In such an embodiment, only one driving mechanism, which drives the rotation shaft is enough for being rotated around the test light source. This can provide much higher speed with the same accuracy as that in the centric moving mirror goniophotometers. With the two detectors, the two measuring distance can be conveniently achieved without additional alignment. This design can achieve the widest dynamic range and the highest detection sensitivity.

This disclosure can be perfected by the following technologies.

In one embodiment, the position and attitude of the first detector is adjustable. They can be adjusted so that the first detector faces the test light source in normal direction with its optical axis perpendicularly intersecting the main horizontal axis and passing through the cross point of the main horizontal axis and the vertical axis. That is, by adjusting the position and attitude, the first detector can achieve the above mentioned functions of the second detector.

In another embodiment, an electronic imaging device can be mounted in said swing arm. A sensitivity surface of the electronic imaging device faces toward the test light source with its optical axis perpendicularly intersecting the main horizontal axis and passing through the cross point of the main horizontal axis and the vertical axis. The electronic imaging device has multi-channel optical sensitivity elements. The electronic imaging device can be an imaging luminance meter which can measure the luminance of multi-point on one plane simultaneously. The electronic device can also be a camera which can take photos or video. The electronic imaging device can be arranged on a support connecting to the swing arm and can be rotated along with the swing arm. By the rotation of the swing arm and the light source, the electronic imaging device can observe the light source in different angles and can provide intuitionistic pictures of the light source. The electronic imaging device is very useful to appraise the test light source since the luminance, luminous distribution and the lighting area of the light source can be directly and comprehensively obtained by such a device. If the electronic imaging device is an imaging luminance meter, the luminance and luminance distribution of the light source in every spatial direction can be measured. Thus, parameters of glare can be easily and accurately calculated.

In still another embodiment, a third detector and a switching mechanism can be placed on the upright mirror tower. The third detector receives the light beam reflected from the rotation mirror. The switching mechanism switches the upright mirror or the third detector into the measurement light path to work. The third detector can be a static one, when it is switched into the light path, the third detector faces the light source and its optical axis is overlapped with the main horizontal axis. However, the third detector can be connected to the upright mirror tower via a rotation mechanism which can drive the third detector around a horizontal axis. The optical axis of the third detector intersects the horizontal axis in a certain angle with the cross point at the center of the sensitivity surface of the third detector. When the third detector is switched into light path, the horizontal axis for the third detector is overlapped with the main horizontal axis, and the angle between the optical axis of the third detector and the main horizontal axis ensures the light beam from the test light source being reflected by the rotation mirror into the third detector in normal direction. Driven by the rotation mechanism, the third detector can be rotated around the main horizontal axis synchronously with the swing arm. When switching the upright mirror into the light path, the position and attitude of the upright mirror are the same as discussed above, which is to face the test light source and perpendicular to the main horizontal axis with the cross point in its optical center. The third detector can provide a third luminous intensity measurement distance without additional adjustment and alignment of the system. It can achieve the middle-distance field measurement. With the synchronous rotation mechanism, the test light can always enter the third detector by zero degree, and stray light caused by the large view angle of a detector in circus moving mirror goniophotometer can thus be largely reduced. The switching mechanism can be a rotation mechanism. The third detector and the upright mirror can be arranged back to back, or at other angles, like perpendicularity. Also, the switching mechanism can be a slide mechanism and the third detector and the upright mirror are arranged side by side.

In further another embodiment, a spectrometer can be mounted in the swing arm, wherein an acceptance interface of a light collection device faces toward the test light source. The spectrometer is a high speed multi-channel spectrometer having an array detector, e.g., a charge-couple device (CCD) or a photodiode array (PDA). By rotating the swing arm, the high speed spectrometer can measure the spatial spectral distribution of the test light source. This is especially useful for new types of light sources, such as light-emitting diodes (LEDs) or LED modules or LED luminaries.

In further another embodiment, stray light baffles can be added on front of sensitivity surfaces of the first detector, the second detector, and the third detector (if included in the goniophotometer). The detectors can be housed in shield pipes, and the stray light baffles are placed inside the shield pipes. There are open holes in these stray light baffles, the size of which is slightly lager than the design size of the light beam at the place where the baffles are mounted. A design size is determined by measuring the peripheral portion of a light beam from the largest measurable test light source to the photometric center detector. The largest measurable test light source is the largest size of light source that a goniophotometer can measure, which relates to, e.g., the rigidity and the rotation space of a goniophotometer. The shield pipe of the first detector should be long enough to exclude stray light and to prevent the first detector from receiving light discharged directly from the test light source.

One of the above diaphragms is placed on front of the upright mirror to exclude stray light. As we have explained above, the upright mirror itself can act as a diaphragm. However, the dimension of the mirror is designed for measuring the largest measurable test light source. For testing smaller test light sources, the performance of the upright mirror is not as good in rejecting stray light. Diaphragms are needed, for example, particularly in such a case. It will be appreciated that one diaphragm having an adjustable aperture or a set of diaphragms having various apertures can be used on front of the upright mirror depending on the size of the test light source.

The goniophotometer can keep the test light source more stable and reduce stray light. This makes the measurement more accurate.

In further another embodiment, the detectors can be photometer heads, colorimeter detectors or radiometer heads whose sensitive wavelength range is in the range of UV-VIS-nIR. However, usually, the first detector, the second detector and the third detector (if included in the goniophotometer) are photometer heads. The detectors can use the same photometer heads if the accuracy requirement is not very high. If the accuracy requirement is high, photometer heads having different relative spectral responsivity curves can be used. In one embodiment, the relative spectral responsivity curve of the second detector matches the CIE $V(\lambda)$ function, that is $S2(\lambda) \approx V(\lambda)$, while the relative spectral responsivity curve of the first detector $S1(\lambda)$ multiplied by the spectral reflective curve of the rotation mirror $Rr(\lambda)$ and further by the spectral reflective curve of the upright mirror $Rp(\lambda)$ matches the CIE $V(\lambda)$ function, that is $S1(\lambda) \times Rr(\lambda) \times Rp(\lambda)/MAX(S2(\lambda) \times Rr(\lambda) \times Rp(\lambda)) \approx V(\lambda)$. In this way, spectral selective reflection of the rotation mirror and upright mirror can be effectively reduced.

In further another embodiment, the imaging luminance meter can further include filters in front of the optical sensitivity elements in addition to objective lens. When the filters are utilized to match the CIE $V(\lambda)$ function, the test items of the imaging luminance meter are luminance and luminance distribution. However, when the filters matches the CIE tristimulus curves $x(\lambda)$, $y(\lambda)$ and $z(\lambda)$, the measurable items are colorimetry, luminance and colorimetry and luminance distribution.

In further another embodiment, a built-in laser machine, the first laser machine, can be placed in the fixed shaft. A laser beam discharged from the first laser machine has an axis being overlapped with the main horizontal axis. In addition, a second laser machine can be placed in the swing arm. A laser beam discharged from the second laser machine has an axis passing through the cross point of the main horizontal axis and the vertical axis. The light path of the goniophotometer as well as the photometric center of the test light source can be conveniently aligned by the laser beams discharged from the first and second laser machines. The second laser machine can emit cross laser beam which help adjust the goniophotometer more conveniently.

A lock/unlock mechanism can be placed in the fixed shaft, wherein a driving mechanism helps rotate the fixed shaft. After unlock the lock/unlock mechanism, the fixed shaft can be rotated around the main horizontal axis so that the lamp support arm and the test light source mounted therein can be driven to rotate and the attitude of the test light source can be adjusted. When the test light source is at the required burning attitude, the lock/unlock mechanism can be locked and the fixed shaft is back to the fixed state again. The above described lock/unlock mechanism can also be placed in the lamp support arm. In such situation, the fixed shaft is always fixed, while the lamp support arm can be rotated around a horizontal axis. The lock/unlock mechanism can also be used to lock the attitude of the test light source, which is the tilt angle of the test light source, after the test light source is adjusted to the required attitude.

In further another embodiment, the rotation shaft can be driven by an output shaft of a worm reducer or a gear reducer. The rotation mechanism of the test light source can be a motor or a motor with a worm reducer or harmonic reducer. Angle sensors can be placed round any of the output shafts for the corresponding rotation driving mechanism to measure an angle displacement. The angle sensors can be angle encoders directly enclosing the output shaft or gear wheels connected to an angle encoder.

In further another embodiment, the rotation shaft is connected to the lamp support arm by a guide rail/guide block mechanism. More specifically, the output end of the rotation shaft is rigidly connected to the guide rail (i.e. a coattail rail), and the guide block is connected to the lamp support arm and is placed on the guide rail. A threaded shaft drives the guide block as well as the lamp support arm moving up and down on the guide rail. With this design, aligning the test light source such that its photometric center is at the rotation center becomes convenient and accurate.

In further another embodiment, a screen can be placed between the main support tower and the upright tower in the main horizontal axis. The screen can be a funnel absorption cavity or a plane baffle. The surface of the screen can be painted matt black. The size of the screen is configured such that the screen just blocks a test light beam directly from the test light source to the upright mirror. The support of the screen can be connected to the lamp support arm so that the test light beam will not be blocked.

In further another embodiment, one end of the fixed shaft or the entire fixed shaft is hollow. Cables such as a power cable for the test light source, a control cable for the drive motor to drive the test light source around the vertical axis, etc. can pass through the interior of the fixed shaft and reach the main support tower.

In further another embodiment, an angle sensor and a slip ring can be used in the rotation shaft. The slip ring can be used for connecting the cables, for example, power cables and signal cables of the first detector and the second detector, from the swing arm to the main support tower. This can help avoid the cables being twisted during the process of measurement. The slip ring can also be placed in the rotation shaft next to the connection knot with the swing arm. The cables in the swing arm can be connected to the fixed shaft by the slip ring and are then led to the main support tower. The cables can also be led to the main support tower by the following method: set a wiring hole along the horizontal axis in the rotation shaft, pass the cables through the wiring hole, guide the cables to the main support tower by a slip ring, wherein the slip ring can alternatively be placed in the bearing support.

In further another embodiment, a wireless emitting and receiving mechanism can be used in the swing arm. The wireless emitting/receiving mechanism can be used to control the working state of the first detector and the second detector and to emit signals of data measured by the first and second detectors. At the same time, the electrical equipments in the rotation shaft such as the second laser machine, the first detector, the second detector, etc., can be powered by batteries. By this technology, the number of cables used in the system can be reduced. In an alternative embodiment, the slip ring is still used for connecting the power cables for the electrical devices, while the control signals and data signals can be transmitted by the wireless emitting/receiving mechanism. This can also largely reduce the number of cables.

In further another embodiment, a camera can be placed on a side of the goniophotometer to record the measuring state by photos or video so as to provide a real and intuitionistic report.

The existing technologies, e.g. micro-electronic circuit, software, electrical controllers, computers and computer software are utilized to achieve the functions of auto control measurement, and information display and recordation, etc.

According to the above description, the benefits of this disclosure include: 1) space of a darkroom is largely reduced, 2) a test light source works in a highly stable burning state, 3) effects of stray light is largely excluded from the test results so that errors is largely reduced and the precision of the system is enhanced, 4) by using different detectors, both the near-field and far-field measurements can be achieved without additional alignments and adjustments, and 5) the dynamic range of the system is very wide.

DRAWINGS

The disclosure will be explained in more detail in the following text using one exemplary embodiments and with reference to the drawings, in which.

DETAILED DESCRIPTION

Figure 3:
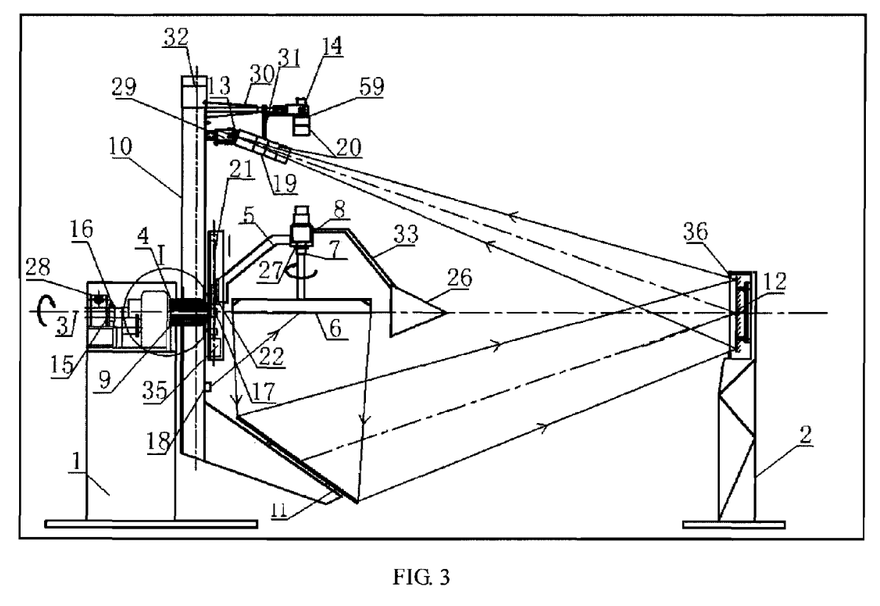
FIG. 3 is a sketch of one example of this disclosure.
Figure 4:
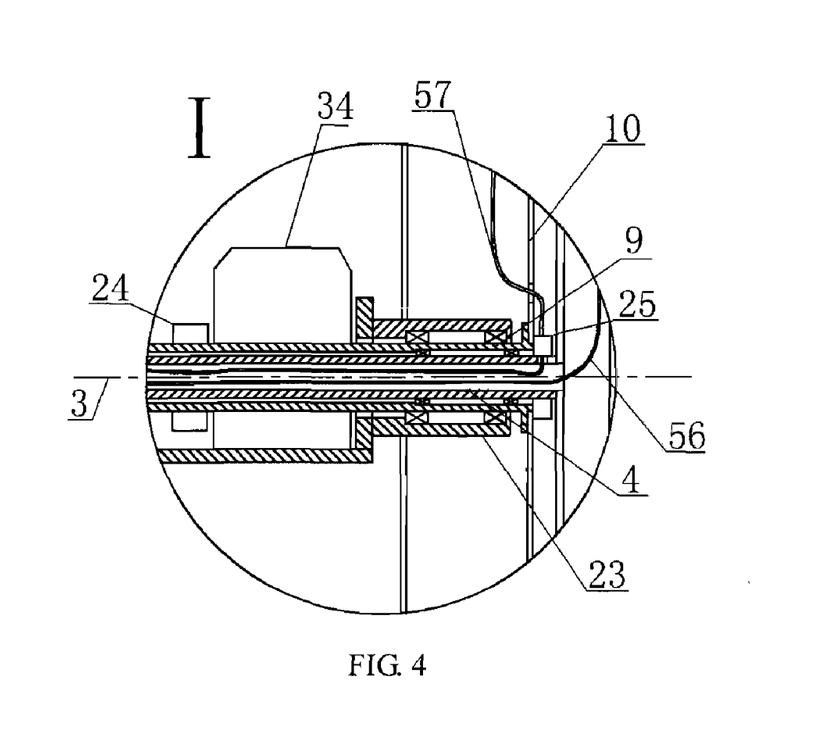
FIG. 4 is a zoom-in picture of Part I in FIG. 4.

FIGS. 3 and 4 schematically illustrate an embodiment of a goniophotometer which includes a main support tower 1, an upright mirror tower 2, a main horizontal axis 3 being virtually placed, a fixed shaft 4 being placed coaxially with the main horizontal axis 3, and a lamp support arm 5. One end of the lamp support arm 5 is connected to the fixed shaft 4 and the other end of the lamp support arm 5 holds a test light source 6 through a rotation drive mechanism 8 which drives the test light source 6 around a vertical axis 7 that is perpendicular to the main horizontal axis 3. As shown in FIG. 4, a rotation shaft 9 is rotated around the main horizontal axis 3 in a bearing mounted on the outside surface of the fixed shaft 4. The rotation shaft 9 is connected to a bearing support 23, which is rigidly connected to the main support tower 1 by the outside bearing. An end of the rotation shaft 9 is rigidly connected to a swing arm 10. A rotation mirror 11 and a first detector 13 are connected to two ends of the swing arm 10 respectively. An upright mirror 12 is rigidly fixed on the upright mirror tower 2 on the opposite side to the main support tower 1. The upright mirror 12 is perpendicular to the main horizontal axis 3 and the perpendicular foot is about at the center of the upright mirror 12. Both the rotation mirror 11 and the upright mirror 12 are flat. The shape of the upright mirror 12 is round and the shape of the rotation mirror 11 is elliptic.

The swing arm 10 includes a weight balancer 32 on a side closer to the first detector 13. The first detector 13 is inside a long shield pipe 19, which is connected to the swing arm 10 through an angle adjustment mechanism 29. A girder 30 is connected to the swing arm 10 next to the first detector 13. The girder 30 is perpendicular to the swing arm 10. One end of the girder 30 is rigidly fixed to the swing arm 10 and the other end of the girder 30 is connected to a second detector 14 and a shield pipe 59. A connection mechanism 31 is configured to be connected to the shield pipe 19 of the first detector 13 to make the first detector 13 steadier. The second detector 14 faces toward the test light source 6 in normal direction. The optical axis of the second detector 14 is perpendicular as to the main horizontal axis 3. This axis passes through the cross point of main horizontal axis 3 and the vertical axis 7 and the light from the test light source 6 to the second detector 14 should not be blocked by the shield pipe 19 of the first detector 13.

Figure 5:
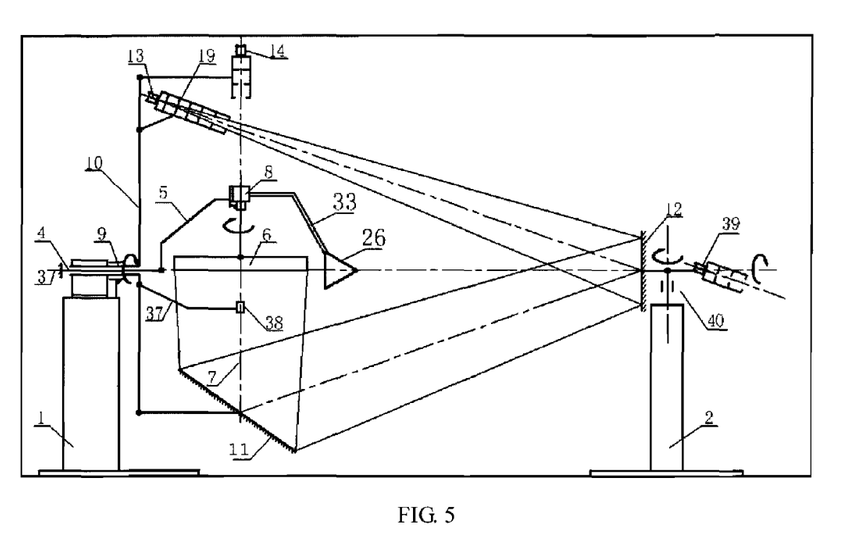
FIG. 5 is a simplified sketch of another example of this disclosure.

As shown in another embodiment in FIG. 5, in addition to the system discussed above, an auxiliary support 37 can be rigidly connected to the swing arm 10. One end of the auxiliary support 37 is connected to the swing arm 10. The other end of the auxiliary support 37 supports an imaging luminance meter 38. The imaging luminance meter 38 has multi-channel optical sensitivity elements and includes objective lens and filters on front of the sensitivity elements to match the CIE V($\lambda$) function. The CIE V($\lambda$) function is a luminous efficiency provided by CIE, which describes the photopic response of human eyes to the electromagnetic radiation with different wavelengths. The imaging luminance meter 38 faces the test light source 6 and has an optical axis being perpendicular to the main horizontal axis 3. This axis passes through the cross point of the main horizontal axis 3 and the vertical axis 7. The sensitivity elements of the imaging luminance meter 38 can not "see" the rotation mirror 11.

Figure 6:
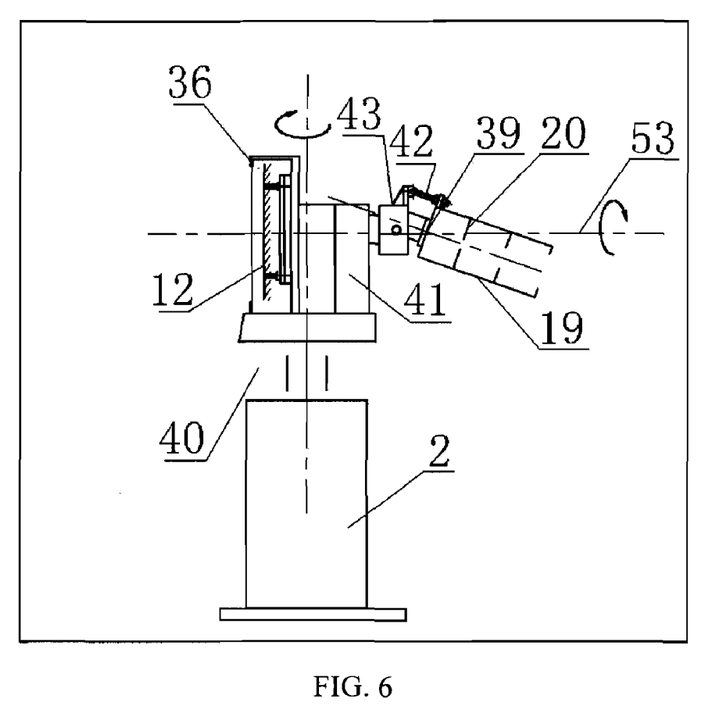
FIG. 6 is a sketch of the upright mirror tower in the example in FIG. 5.
Figure 7:
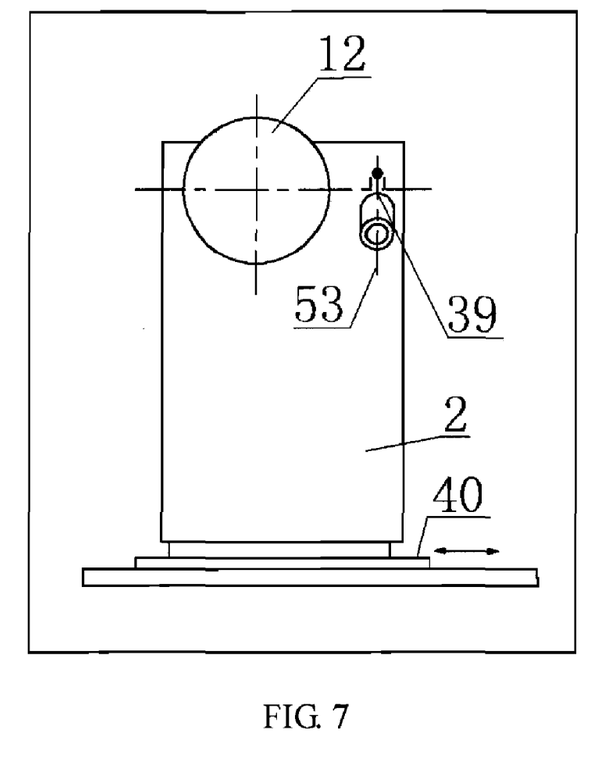
FIG. 7 is a sketch of an upright mirror tower in another embodiment.

In the embodiment as shown in FIG. 5, in addition to the upright mirror 12, the upright mirror tower 2 also includes a third detector 39 receiving a light beam from the rotation mirror 11 and a switching mechanism 40 which switches the upright mirror 12 or the third detector 39 into the light path. FIGS. 6 and 7 are sketches of the upright mirror tower 2. In FIG. 6, the upright mirror 12 and the third detector 39 are arranged back to back. The switching mechanism 40 is a rotation mechanism which rotates the upright mirror 12 and the third detector 39 in a horizontal plane. In the embodiment in FIG. 7, the upright mirror 12 and the third detector 39 are arranged side by side, and the switching mechanism 40 is a rail. The upright mirror tower can slide horizontally on the rail to switch the upright mirror 12 or the third detector 39 into the light path. In both embodiments, the third detector 39 is connected to the upright mirror tower 2 by a rotation mechanism 41. An output shaft of the rotation mechanism 41 is connected to a clamping mechanism 43 on the third detector 39 so that the third detector 39 can rotate around a horizontal axis 53, while the optical axis of the third detector 39 intersects the horizontal axis 53 at a certain angle with the cross point at the center of a sensitivity surface of the third detector 39. When the switching mechanism 40 places the third detector in the system, the horizontal axis 53 of the third detector 39 is overlapped with the main horizontal axis 3, and the angle between the optical axis of the third detector 39 and the main horizontal axis 3 is adjustable by an angle adjustment mechanism 42. The adjusted angle allows a light beam from the test light source 6 and being reflected by the rotation mirror 11 to enter the third detector 39 in normal direction.

The following descriptions apply to both embodiments as shown in FIGS. 3 and 5.

Figure 8A:
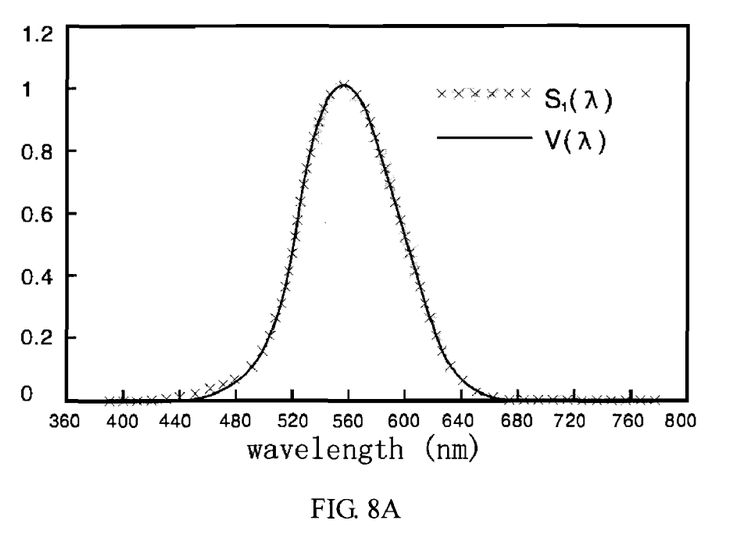
FIG. 8A is a graph of a relative spectral responsivity curve of a first detector compared to the CIE V($\lambda$) curve.
Figure 8B:
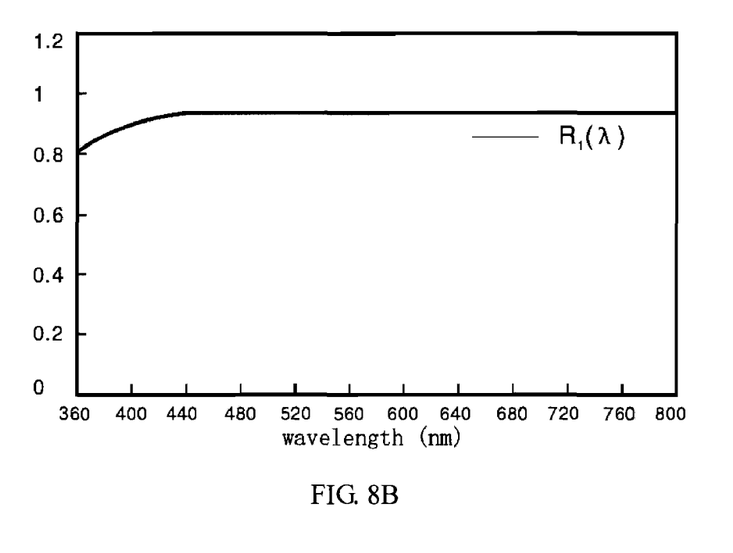
FIG. 8B is a graph of a spectral reflective curve of a rotation mirror.
Figure 8C:
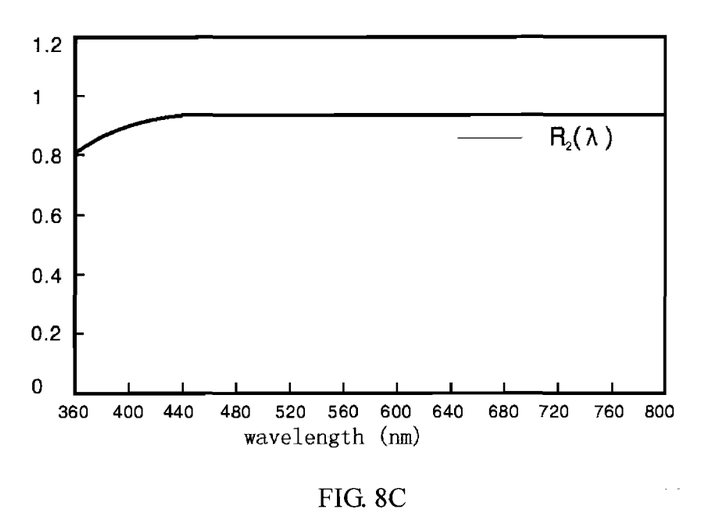
FIG. 8C is a graph of a spectral reflective curve of a upright mirror.
Figure 8D:
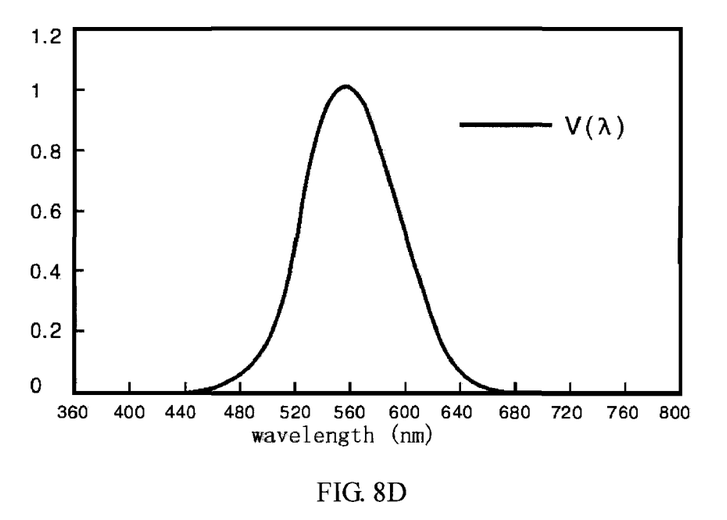
FIG. 8D is a graph of the CIE V($\lambda$) curve.

Both the shield pipes 19 and 59 include stray light baffles 18 therein. The stray light baffles 18 have open holes therethrough. The size of the open holes is slightly lager than the design size of the light beam where the baffles are mounted. The first detector 13, the second detector 14 and the third detector 39 (if included in the goniophotometer) are all photometer heads. The relative spectral responsivity curves of the second detector 14, $S2(\lambda)$, and the third detector 39 (if included in the goniophotometer), $S3(\lambda)$, match the CIE $V(\lambda)$ function, that is ($S2(\lambda) \approx V(\lambda)$ and $S3(\lambda) \approx V(\lambda)$), while the relative spectral responsivity curve of the first detector 13, $S1(\lambda)$, indirectly matches the CIE $V(\lambda)$ function by multiplying the spectral reflective curve of the rotation mirror 11, $Rr(\lambda)$ and the spectral reflective curve of the upright mirror 12, $Rp(\lambda)$, that is $S1(\lambda) \times Rr(\lambda) \times Rp(\lambda) / MAX(S1(\lambda) \times Rr(\lambda) \times Rp(\lambda)) \approx V(\lambda)$, as shown in FIG. 8A-8D. FIG. 8A shows a relative spectral responsivity curve of the first detector compared to the CIE $V(\lambda)$ curve. FIG. 8B shows a spectral reflective curve of the rotation mirror. FIG. 8C shows a spectral reflective curve of the upright mirror. FIG. 8D shows the CIE $V(\lambda)$ curve. Since the spectral reflective curves of the mirrors are lower in short wavelength part, the relative spectral responsivity curve of the first detector have to be higher in this part correspondingly.

Figure 9:
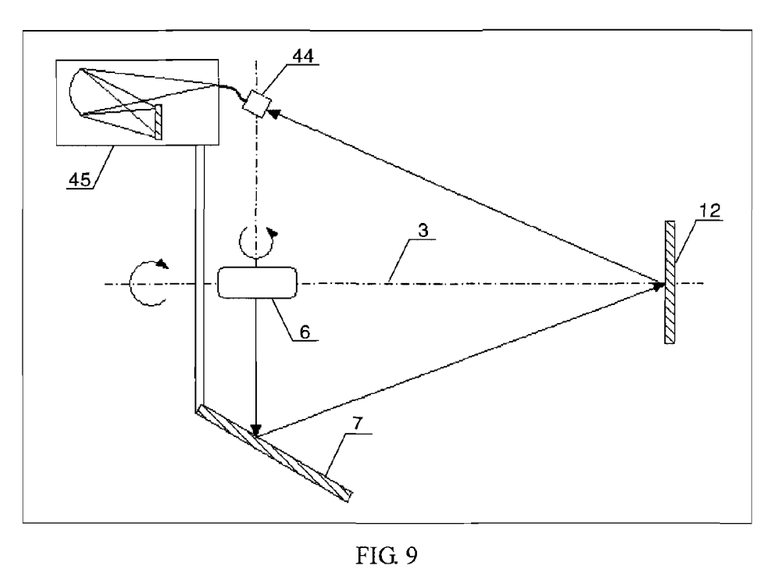
FIG. 9 is a sketch of another embodiment of this disclosure.

The first detector 13, the second detector 14 or the imaging luminance meter 38 (if included in the system) can be replaced by a light sampling device 44 of a spectrometer 45, as shown in FIG. 9. The spectrometer 45 can measure the spectral intensity distribution of the test light source 6 in certain direction and certain distance. Preferably, the spectrometer is a fast scan spectrometer, which can ensure measurement speed.

In another embodiment, a diaphragm 36 can be placed on front of the upright mirror 12 to reject stray light. In further another embodiment, a set of diaphragms 36 having different size can be used selectively according to the dimension of the test light source 6 so as to reject the stray light more effectively. The diaphragms 36 are held by the upright mirror support 2.

A funnel absorption cavity 26 is placed on the main horizontal axis 3 between the main support tower 1 and the upright mirror tower 2 with the wide mouth side facing the test light source 6. The size of the funnel absorption cavity 26 is configured to block a light emitting from the light source 6 to the upright mirror 12. A support 33 of the funnel absorption cavity 26 is connected to the lamp support arm 5.

The fixed shaft 4 is a hollow shaft. The fixed shaft 4 has a lock/unlock mechanism 15 and 16 at an end where the fixed shaft 4 is connected to the main support tower 1. The lock/unlock mechanism is composed by a bolt 16 and a threaded hole 15. When the bolt 16 is taken out, the fixed shaft 4 and the lamp support arm 5 can be rotated around the main horizontal axis driven by an output shaft of a worm 28. The fixed shaft 4 can be placed back to the fixed state by placing the bolt 16 into the threaded hole 15. On the other end of the fixed shaft 4, a coattail type guide rail 21 is rigidly connected with the fixed shaft 4. A guide block 22 driven by a motor 35 through threaded shaft is connected to the lamp support arm 5 and can move along the guide rail 21, so that the lamp support arm 5 can be moved up and down.

The rotation drive mechanism 8 on the lamp support arm 5 has a servomotor having a worm speed reducer or a worm gear speed reducer. There is an angle encoder 27 enclosing an output shaft of the rotation drive mechanism 8 for the light source. A power cable 56 for the light source 6 and the first and second detectors 13, 14 and a signal cable 57 for the rotation drive mechanism 8 and the first and second detectors 13, 14 are both led to the main support tower 1 by passing through an interior of the fixed shaft 4.

As shown in FIG. 4, an end of the rotation shaft 9 is connected to an output shaft of a worm reducer 34 driven by a servomotor. An angle encoder 24 is connected to the rotation shaft 9 on an end closer to the worm reducer 34. The other end of the rotation shaft 9 is connected to the swing arm 10. A slip ring 25 encloses the rotation shaft 9. The power cables 56 and signal cables 57 pass through the slip ring 25 to the fixed shaft 4 and then are led to the main support tower 1 by passing through the interior of the fixed shaft 4.

A first laser machine 17 is placed on the fixed shaft 4, wherein a laser beam discharged by the first laser machine 17 is coaxial with the main horizontal axis 3. The second laser machine 18 discharging a cross laser beam is placed on the swing arm 10, wherein a laser beam from the second laser machine 18 travels through the cross point of the main horizontal axis 3 and the vertical axis 7.

The test light source 6 can be positioned, aligned and adjusted by using the first laser machine 17 and the second laser machine 18. The photometric center of the test light source 6 shall be positioned at a rotation center of the goniophotometer, which is the cross point of the main horizontal axis 3 and the vertical axis 7. The test light source 6 can be positioned in the vertical direction by aligning it with a beam discharged from the first laser machine 17. Then the test light source 6 can be adjusted by adjusting the guide rail 21 and guide block 22. The horizontal position of the test light source 6 can be aligned with a cross point of two laser beams discharged from the first laser machine 17 and the second laser machine 18 respectively. When necessary, unlock the lock/unlock mechanism 15, 16 and drive the fixed shaft 4 through the worm 28 to allow the attitude of the test light source 6 to be conveniently adjusted to the required burning state.

When the two towers 1, 2 are positioned, and the position and attitude of the rotation mirror 11, the upright mirror 12, the first detector 13, the second detector 14 and the third detector 39 (if included in the goniophotometer) are determined, the measurement distance can be conveniently set between the far-field and near-field without additional adjustment. One measurement distance is equivalent to that from the test light source 6 to the rotation mirror 11 and then to the upright mirror 12 and at last to the first detector 13. Another measurement distance is equivalent to that between the photometric center of the test light source 6 and the second detector 14. If the third detector 39 is included in the goniphotometer, a third measurement distance is equivalent to that from the test light source 6 to the rotation mirror 11 and then to the third detector 39. It will be appreciated that when using the second detector 14, the two mirrors 11, 12 can be covered with matt black velvet. By rotating the swing arm 10, the first detector 13 or the second detector 14 can receive a test light beam from different angles. By rotating the swing arm 10 around the test light source 6 in a range of −180°~+180° (or 0~360°) and rotating the test light source 6 around the vertical axis 7 in a range of −180°~+180° (or 0~360°), the goniophotometer can easily measure the luminous intensity distribution of the test light source 6 in different spatial angle. In the embodiment as shown in FIG. 5, the luminance, luminous intensity distribution and the intuitionistic pictures of the test light source 6 in different spatial angles can be accurately and conveniently obtained. This facilitates the inspection and application of the light source 6. It will be appreciated that a configuration of an electronic imaging device can be applied to the embodiments in FIGS. 3-9.

The disclosed technology can be used in combination with, for example, microelectronic circuits, electrical controllers, computers and computer software to control the goniophotometer and to display, measure, calculate and record luminous intensity distribution.

The invention claimed is:

1. A goniophotometer comprising:
a main support tower having a main horizontal axis;
an upright mirror tower facing the main support tower;
a fixed shaft being placed coaxially with the main horizontal axis, a lamp support arm having first and second ends with the first end being connected to the fixed shaft, a test light source being connected to the second end of the lamp support arm by a rotation drive mechanism, the rotation drive mechanism driving the test light source to rotate around a vertical axis that perpendicularly intersects the main horizontal axis;
a rotation shaft being rotated around the main horizontal axis in a bearing that is mounted on an outer frame of the fixed shaft;
a swing arm being connected to the rotation shaft, the swing arm having first and second ends, a rotation mirror being fixed to the first end of the swing arm, a first detector being fixed to the second end of the swing arm;
an upright mirror being rigidly fixed to the upright mirror tower, the upright mirror being perpendicular to the main horizontal axis;
the rotation mirror, the upright mirror and the first detector being configured such that a test light beam emitted from the test light source entering into the rotation mirror and then being reflected to the upright mirror, and then being reflected into an optical center of a sensitive surface of the first detector in a normal direction; and
both the rotation mirror and the upright mirror being flat, the shape of the rotation mirror being elliptic, round or octagonal, the shape of the upright mirror being round or ellipse or octagonal.

2. The goniophotometer according to claim 1, further comprising a second detector on the swing arm, the second detector facing the test light source, an optical axis of the second detector perpendicularly intersecting the main horizontal axis and passing through a cross point of the main horizontal axis and the vertical axis.

3. The goniophotometer according to claim 1, further comprising an electronic imaging device mounted on the swing arm, a sensitivity surface of the electronic imaging device facing the test light source, an optical axis of the sensitivity surface perpendicularly intersecting the main horizontal axis and passing through a cross point of the main horizontal axis and the vertical axis.

4. The goniophotometer according to claim 1, wherein the first detector is configured such that the first detector can be adjusted to face the test light source in the normal direction with an optical axis of the first detector perpendicularly intersecting the main horizontal axis and passing through a cross point of the main horizontal axis and the vertical axis.

5. The goniophotometer according to claim 1, wherein the upright mirror tower further comprises a third detector that receives a light beam from the rotation mirror, the upright mirror tower further comprising a switching mechanism for switching the upright mirror or the third detector into a light path to perform measurement work.

6. The goniophotometer according to claim 5, wherein the third detector is connected to the upright mirror tower by a rotation mechanism, the rotation mechanism driving the third detector to synchronously rotate with the swing arm around a horizontal axis of the third detector, and an optical axis of the third detector intersecting the horizontal axis of the third detector in a certain angle such that a cross point is at a center of a sensitivity surface of the third detector,
when the third detector is switched into the light path, the horizontal axis of the third detector being overlapped with the main horizontal axis, and an angle between an optical axis of the third detector and the main horizontal axis ensuring a light beam from the test light source to be reflected by the rotation mirror into the third detector in a normal direction.

7. The goniophotometer according to claim 1, further comprising a spectrometer mounted on the swing arm, the spectrometer having a light collection device including an acceptance interface, wherein the acceptance interface faces toward the test light source.

8. The goniophotometer according to claim 2, wherein the first detector and the second detector are photometer detectors, the second detector having a relative spectral responsivity curve that matches a CIE V(λ) function, the first detector having a relative spectral responsivity curve that matches the CIE V(λ) function by multiplying a spectral reflective curve of the rotation mirror and a spectral reflective curve of the upright mirror.

9. The goniophotometer according to claim 3, wherein the electronic imaging device has multi-channel photoelectrical sensitivity elements, the electronic imaging device comprising an imaging luminance meter or a camera configured to provide photos or video.

10. The goniophotometer according to claim 2, further comprising stray light baffles on a front of the sensitivity surface of the first detector and a sensitivity surface of the second detector.

11. The goniophotometer according to claim 1, further comprising at least one diaphragm on a front of the upright mirror, the diaphragm having an aperture, a center of the aperture being on the main horizontal axis.

12. The goniophotometer according to claim 1, wherein a first laser machine is placed in the fixed shaft, a laser beam discharged from the first laser machine being overlapped with the main horizontal axis.

13. The goniophotometer according to claim 1, wherein a second laser machine is placed in the swing arm, a laser beam discharged from the second laser machine passing through a cross point of the main horizontal axis and the vertical axis.

14. The goniophotometer according to claim 1, wherein the fixed shaft is connected to the lamp support arm by a guide rail/guide block mechanism, the guide rail/guide block mechanism being configured to move the lamp support arm up and down.

15. The goniophotometer according to claim 1, further comprising a lock/unlock mechanism placed in the fixed shaft or the lamp support arm, the lamp support arm rotating around a horizontal line when the lock/unlock mechanism is unlocked.

16. The goniophotometer according to claim 1, further comprising an angle sensor in the rotation shaft or an output shaft of a reducer connected to the rotation shaft for recording an angle displacement of the rotation shaft, and further comprising a slip ring in the rotation shaft or on a bearing support outside the rotation shaft.

17. The goniophotometer according to claim 1, further comprising an angle sensor on an output shaft connecting the test light source and the rotation driven mechanism.

18. The goniophotometer according to claim 1, wherein one of an end or the entire fixed shaft is hollow, cables passing through an interior of a hollowness of the fixed shaft.

19. The goniophotometer according to claim 1, further comprising a baffle to block a direct illuminant from the test light source to the upright mirror, the baffle being placed on the main horizontal axis and between the main support tower and the upright mirror tower, the baffle being supported by a support which is connected to the lamp support arm.

20. The goniophotometer according to claim 1, further comprising a wireless emitting and receiving mechanism in the swing arm to receive control signals and emit data signals.

* * * * *